United States Patent [19]
McGinty

[11] Patent Number: 5,165,363
[45] Date of Patent: Nov. 24, 1992

[54] COMBINED BIRD EXERCISER, EDUCATOR, FEEDER AND TOY

[76] Inventor: Glenn H. McGinty, 1900 Centaur Cir., Lafayette, Colo. 80020

[21] Appl. No.: 538,916

[22] Filed: Jun. 15, 1990

[51] Int. Cl.$^5$ .............................................. A01K 39/01
[52] U.S. Cl. ..................................... 119/18; 119/57.8
[58] Field of Search ............... 119/57.8, 18, 60, 51.03, 119/29, 52.2, 58, 57.9, 17, 21; 217/40, 42

[56] References Cited

U.S. PATENT DOCUMENTS

| | | | |
|---|---|---|---|
| 83,678 | 11/1868 | Weston | 217/42 |
| D. 120,852 | 6/1940 | Bishop | 119/57.8 X |
| 718,666 | 1/1903 | Shoemaker | 217/42 |
| 883,907 | 4/1908 | Pecigo | 217/42 |
| 1,084,584 | 1/1914 | Moody | 119/60 X |
| 1,550,438 | 8/1925 | Hohmann | 119/51.03 |
| 1,699,130 | 1/1929 | Anderson | 217/40 |
| 1,778,370 | 10/1930 | Pardue | 217/42 |
| 1,843,864 | 2/1932 | Burnett | 119/18 |
| 2,900,955 | 8/1959 | Danielsen | 119/21 |
| 3,788,279 | 1/1974 | Boehland, Jr. | 119/52.3 |
| 4,026,244 | 5/1977 | Salick | 119/57.8 |
| 4,318,364 | 3/1982 | Bescherer | 119/57.8 |
| 4,434,745 | 3/1984 | Perkins et al. | 119/57.9 |
| 4,958,595 | 9/1990 | Richman et al. | 119/52.2 |

FOREIGN PATENT DOCUMENTS 1386124 4/1988 U.S.S.R. ................. 119/29

OTHER PUBLICATIONS

"New Cages for Canaries", *Popular Mechanics*, Feb. 1939, pp. 287-288.

Primary Examiner—Robert P. Swiatek
Assistant Examiner—Todd E. Manahan
Attorney, Agent, or Firm—Donald W. Margolis; Edwin H. Crabtree

[57] ABSTRACT

This combined device for the exercise, education, feeding and entertainment of birds consists of a container for storing bird treats therein, wherein at least one portion of the container is constructed of frangible material. One or more openings are provided in the container, each opening being large enough and located in such a position that a bird may see treats through the opening, but being small enough so that a large beaked bird may not reach treats which are stored within the container through that opening. In preferred embodiments the device is comprised of a base, a plurality of spaced apart vertical bars, and a top. The base, the top and the vertical bars are composed of frangible material. The bottom of each bar is secured to the base to form an enclosure with the base. Similarly, the top is disposed on and secured to the top of the vertical bars. The space between the vertical bars is wide enough for a large beaked bird to spy any bird treats which are located within the enclosure, but too narrow to allow such a bird to retrieve such bird treats prior to chewing, pecking, tearing or breaking through a frangible portion of the container. A chain may be attached to the base and extend through the container and the top for use in hanging the device. In one embodiment a divider is disposed inside of the container for defining two or more isolated sections for the receipt of bird treats.

19 Claims, 2 Drawing Sheets

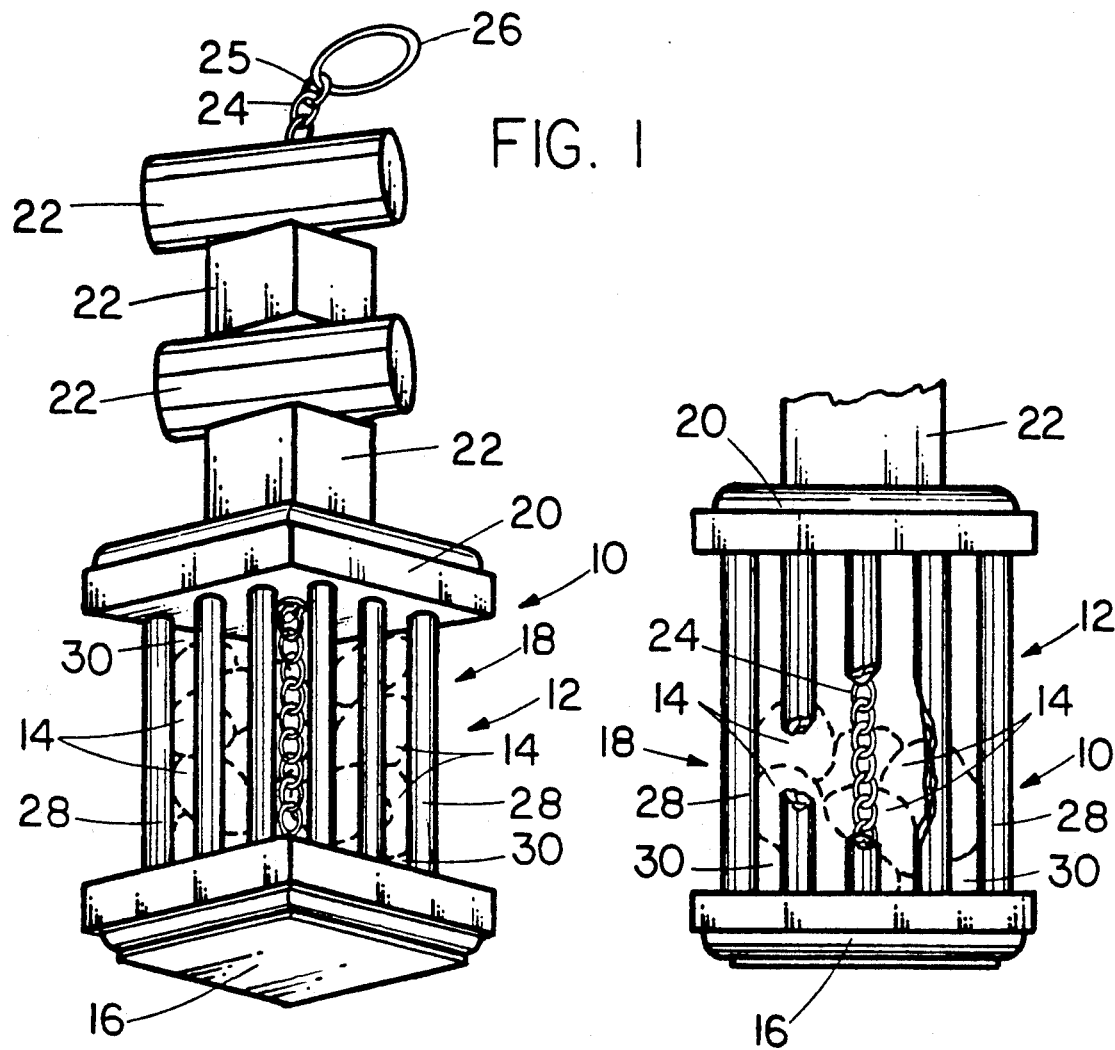
FIG. 1
FIG. 2
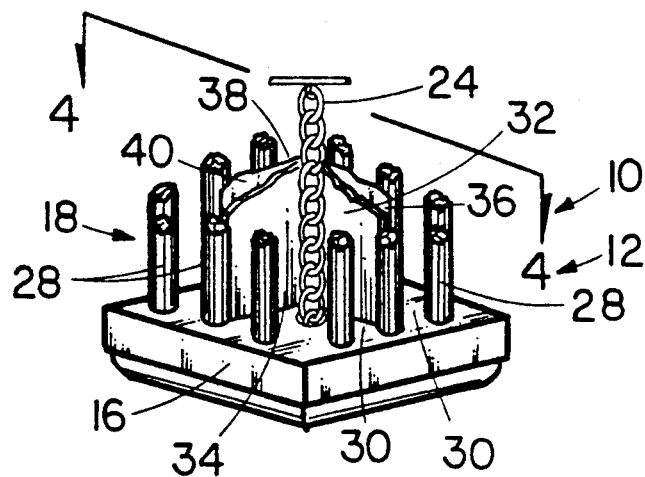
FIG. 3

COMBINED BIRD EXERCISER, EDUCATOR, FEEDER AND TOY

BACKGROUND OF THE INVENTION (a) Field of the Invention

This invention relates to a device for the exercise, education, feeding and entertainment of birds. More specifically it relates to a device in the form of a frangible housing which contains treats which are visible to the bird, but initially unreachable, and which a bird may learn to obtain by breaking through the frangible housing, with the resultant exercise of its beak and the reward of the bird with the treats stored therein.

(b) Discussion of the Prior Art

It is well known in the art that a large variety of bird exercisers and amusement toys have been provided for the enjoyment of domestic caged birds. For example, U.S. Pat. No. 455,042 to Hendryx discloses a bird cage with a swinging porch activating a bell, while a bird actuated bell support is taught in U.S. Pat. No. 2,707,937 to Herman, a parakeet exercise perch is described in U.S. Pat. No. 2,707,937 to Winton et al., U.S. Pat. No. 4,542,714 to Ingraham et al. shows a multi-element bird exerciser and amusement toy, and a tree apparatus for exercising a bird is depicted in U.S. Pat. No. 4,627,384 to Courteau. In each of these prior art devices the play and/or exercise aspect of the mechanism is its sole function, and none of the devices serves to either educate or feed the bird.

Various forms of domestic caged bird and animal feeders are also well known in the art. In U.S. Pat. No. 1,592,493 to Kelly, a bird feeder of wire screen designed to hold fat or suet while allowing a bird to reach the food between the openings without destroying the wire is taught, while U.S. Pat. No. 1,899,508 to Klein discloses a resilient perch for use with an open feed cup, and U.S. Pat. No. 3,853,096 to Whitty also discloses a feeder having a wire bar structure which allows a small animal to eat food through and between the bars, and U.S. Design Pat. No. 262,746 to Harris also appears to teach an animal feeder which allows an animal to reach food through openings in a mesh structure. In each of these prior art feeding mechanisms the feeding aspect of the device is its sole function, the food is readily visible and accessible, and its use requires only nominal effort by the animal. The devices are made of non-frangible metal or plastic, and none require that the bird or animal learn to search and break through a portion of the device to reach the food, or serves to provide the feeding animal with exercise. Clearly, none of the above mentioned prior art patents disclose a combined bird exerciser, educator, feeder and toy in a single, simple structure.

SUMMARY OF THE INVENTION

In view of the foregoing, it is an object of the present invention to provide a bird a combined bird exerciser, educator, feeder and toy in a single, simple structure.

It is another object of the present invention to provide a bird toy that will educate a bird to exercise its beak by encouraging the bird to engage in hard work and by then rewarding it with a treat.

It is another object of the present invention to not only cause a bird to engage in hard work in the form of exercise of its beak, but to stimulate the bird to learn how best it can obtain a reward of a bird treat when playing with and exercising on a single, simple bird toy.

Still another object of the invention is to provide enjoyment to the possessor of such a combined bird exerciser, educator, feeder and toy when watching a bird use the device.

Another object of the present invention is to provide a combined bird exerciser, educator, feeder and toy system, which system is simple in construction and design.

In their natural habitat, birds, and especially large beaked birds have a natural instinct and a need to search for food, such as berries and nuts, which, after the more readily available supplies are gone, requires that they learn to look in less accessible locations in order to find such food. Also, such large beaked birds are constantly exercising and strengthening their jaws and sharping their beaks by chewing and destroying the wood of trees and shrubs.

A combined device for the exercise, education, feeding and entertainment of birds, is taught. The device consists of a container for storing bird treats therein, wherein at least one portion of the container is constructed of frangible material. One or more openings are provided in the container. Each opening is sized large enough and is located in such a position that a bird may see treats through the opening, but is small enough so that a large beaked bird may not reach treats which are stored within the container through that opening.

In preferred embodiments the combined device for the exercise, education, feeding and entertainment of large beaked birds is comprising, of a base, a plurality of spaced apart substantially vertical bars, and a top. At least a portion, if not all of the base, and a portion, if not all of the top is composed of frangible material. Substantially each of the vertical bars is composed of frangible material, and has a bottom end and a top end. The bottom end of each bar is mounted on and secured to the base to form an enclosure with the base. Similarly, the top is disposed on and secured to the top end of the vertical bars. In accordance with the objects of the present invention, the space between the vertical bars is wide enough for a large beaked bird to spy any bird treats which are located within the enclosure, but too narrow to allow such a bird to retrieve such bird treats prior to chewing, pecking, tearing or breaking through a frangible portion of the container. A line, such as a chain, may be attached to the base and extends through the container and the top for use in hanging the device.

In one embodiment the combined bird device of the present invention includes a divider which is disposed inside of the container for defining, with the container, two or more isolated sections for bird treats. The divider may also be composed of frangible material. Where the divider is not composed of frangible material, a portion of the container enclosure which is external and adjacent to each of the isolated bird treat section is composed of frangible material.

In one alternative embodiment the combined bird device of the present invention includes a cylindrical portion. In another alternative embodiment the combined bird device of the present invention includes an angular housing.

As detailed below, the present invention provides a system which can provide a bird a combined exerciser, educator, feeder and toy in a single, structure which is simple in construction and design. It will be seen that it also provides a bird toy that will educate a bird to exercise its beak by encouraging the bird to engage in hard work, and by then rewarding it with a treat. Additionally, it will be sen how it provides a device which not only causes a bird to engage in the exercise of its jaws and beak, and also stimulates the bird to learn how best it can obtain a treat while playing with and exercising on the device.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a bottom perspective view of the combined bird device of the present invention with other blocks above it and a line in the form of a chain for suspending it from the roof of a bird cage or other support.

FIG. 2 is a side view of a portion of the combined bird device shown in FIG. 1 showing a portion of the frangible housing broken away, as it would be by the beak of a bird in learning and working to gain entrance to the bird treats in the housing.

FIG. 3 is an upper perspective view of a modified form of a broken away portion of a combined bird device housing of the present invention with internal dividers which require a bird to break into multiple sections of the housing in order to gain access to the treats in each section as a reward for the hard work of the bird, and also illustrates how such a housing would appear after all of the vertical housing bars and internal dividers have been broken away by the beak of a bird so that all of the bird treats can be captured.

DESCRIPTION OF THE DRAWINGS

Figure 4:
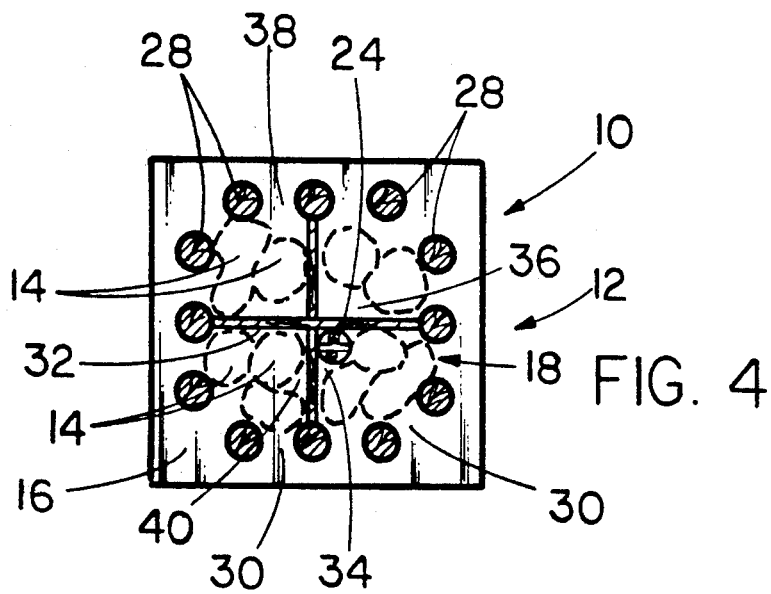
FIG. 4 is a top view of the combined modified bird device taken along lines 4—4 shown of FIG. 3.

In FIG. 1 the combined bird exerciser, educator, feeder and toy device of the present invention is designated, in general, by reference numeral 10. The combined bird device 10, as shown in FIGS. 1-4, is in the form of a cage 12 for containing bird teats 14, shown in phantom lines. The term "treats", as used in this application is intended and defined to mean nuts, rawhide, and any other food or play item desired by different types of birds, which items are of a size and hardness that they can be neither readily pulled through the openings in cage 12, or other form of container, nor be eaten through the openings without requiring the bird to break through or enlarge the openings.

The cage 12, as shown in FIGS. 1-4, includes a frangible base 16 having a frangible container 18 attached to the top thereof for storing treats 14 therein. A frangible top 20 is attached to the top of and encloses container 18. In this embodiment, a plurality of various shaped frangible blocks 22 are disposed, one on top of the other, on top of roof or top 20 to provide additional elements which may be chewed and played with by a bird, and which also add an aesthetic feature to the system. The term "frangible", as used in this application is intended and defined to mean breakable materials, such as wood, rope, vines, and the like, which are of a nature that a bird may peck, break, chew and/or tear through with its beak, and even swallow, without excessive danger of damaging its beak or digestive system. Where the frangible material is wood, its softness or hardness and dimensions may be selected as a means to control the length of time required for the bird to peck, break, chew and/or tear therethrough, although, in general soft wood is preferred.

Each block 22 defines a through-hole, through which is threaded a line 24. Line 24, which is preferably in the form of a chain, as shown, is also secured to base 16, and extends through container body 18, and roof 20. At its upper end 25, chain 24 is attached to ring 26. Ring 26 is useful for suspending the combined bird device of the present invention 10 inside a bird cage, or elsewhere inside the bird possessors home.

FIGS. 1-4 illustrate container 18 with a plurality of closely spaced parallel vertical barrier bars 28 with open spaces 30 therebetween. Spaces 30 are small enough to prevent large beaked birds such as parrots, macaws, cockatoos, and the like from gaining access to treats 14 inside container 18 without chewing, pecking, tearing and/or breaking away the frangible material making up, in this example, vertical barrier bars 28. Its is therefore seen, that the combined bird device of the present invention 10 is designed to teach a bird that it must break through at least a portion of the frangible housing 12 to obtain a treat, encourages a bird to do so, in doing so causes the bird to exercise its jaws and sharpen its beak by chewing, tearing and pecking away at cage 12, and in turn, rewards the bird for its hard work by gaining entrance inside cage 12 and receiving a bird treat 14, all with the resultant entertainment and enjoyment of the bird and its possessor.

In FIG. 2 a side view of the combined bird device of the present invention 10 is shown wherein three of the frangible vertical bars 28 have been pecked, chewed, torn and/or broken away by a bird to allow entrance inside cage 12 and capture one or more bird treats 14. In this view a portion of chain 24 is shown with its lower end secured to base 16 with the remaining bird treats 14 resting thereon and surrounded by the remaining vertical bars 28.

While large beaked birds are mentioned above as enjoying the subject invention it should be kept in mind that birds with smaller beaks, if inclined, would enjoy exercising their jaws and beaks on the combined bird device of the present invention 10, for example, with the open space 30, between bars 28, narrowed to prevent access to the bird treats without chewing, pecking, tearing or breaking away a portion of frangible cage 12.

FIG. 3 is an upper perspective view of a modified form of a broken away portion of combined bird cage device 12. In this embodiment, internal dividers 32 have been located within cage 12, for dividing the interior of cage 12 into individual sections 34, 36, 38, and 40, and functions to prevent the bird from capturing the reward of all of the bird treats 14 at one time. Internal divider 32 require a bird to break into multiple sections 34, 36, 38, and 40 of cage 12 in order to gain access to the treats 14 in each section. Additional details of divider 32 and multiple sections 34, 36, 38, and 40 of cage 12 are shown in FIG. 4. The divider 32 may also be made of a frangible material. Therefore, once the bird gains access to section 34, for example, and enjoys the treats therein, it is now faced with either chewing through a portion of frangible divider 32 to gain access to the adjoining sections 36 or 40, or of returning to the exterior of the container 18 and begin chewing away at the bars 28 which block the remaining sections which still contain treats 14. From this discussion it can be appreciated that not only does the jaw and beak of the bird get exercise while enjoying the combined bird device of the present invention 10, but also the thought or logic process of the brain of the bird is stimulated by requiring it to learn out how to get the reward and nourishment of the bird treats 14.

FIGS. 3 and 4 also illustrate how such a housing would appear, without the top 20 and blocks 22 as illustrated in FIG. 1 and FIG. 2, after an aggressive bird has successfully broken away all of the vertical housing bars 28 and internal divider 32 so that all of the bird treats 14 could be captured from each section. As a result, the lower portions of bars 28, divider 32 and base 16 remain suspended from the chain 24. In this mode, the remaining portions of the device can still provide play and exercise value and stimulation to the bird.

In FIG. 4 a top sectional view of the combined bird device of the present invention 10 is shown taken along lines 4—4 shown in FIG. 3. In this view the individual sections 34, 36, 38, and 40 of the container 18 are shown segregated by divider 32. While the divider 32 is shown dividing the container 18 into four individual sections it should be kept in mind that the divider 32 could easily divide the container 18 into two or more sections for receiving treats 14.

Figure 5:
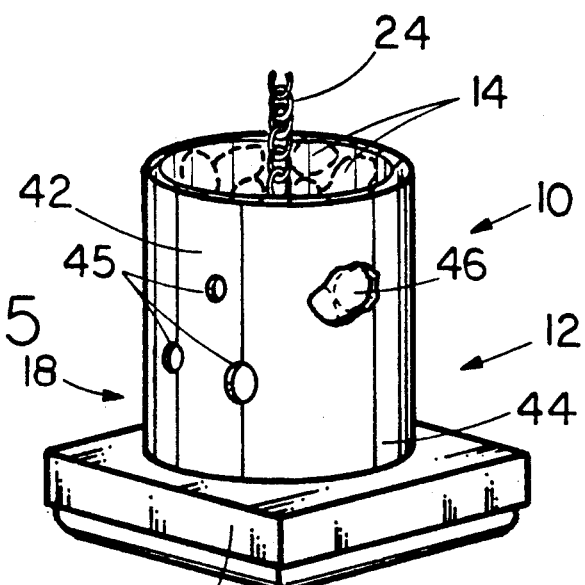
FIG. 5 is an upper perspective view of yet another alternate embodiment of the present invention in which a portion of the frangible housing shown as a cylinder having a few small openings therein, and with a small portion of the cylinder pecked away for gaining entrance therein.
Figure 6:
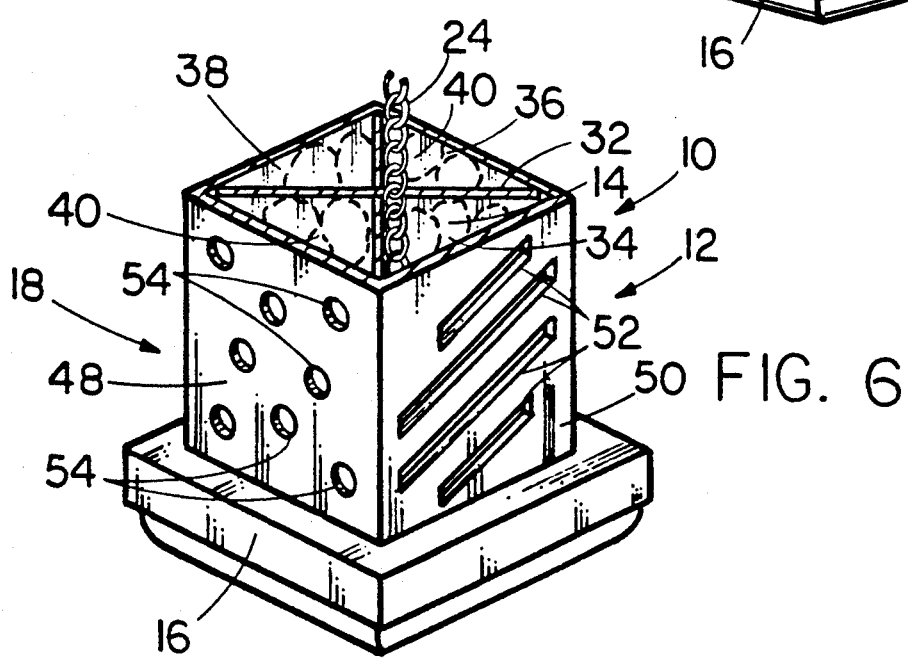
FIG. 6 is an upper perspective view still yet another alternate embodiment of the present invention in which a portion of the frangible housing is shown as a thin wall angular container having spaced openings in the sides thereof and an internal divider system similar to that of FIGS. 3 and 4.

Cage 12 may come in a variety of designs, shapes and sizes without departing from the spirit and scope of the present invention. In FIG. 5 and FIG. 6 alternate embodiments of cage 12 are shown. FIG. 5 shows an upper perspective view of a portion of on such alternate embodiment of the present invention in which a portion of the frangible cage 12 is a frangible cylinder 42 in which there are small openings 45 which allow a bird to see treats 14. A portion 46 of cylinder 42 is shown as having been pecked away by a bird to allow it to gain access to the treats 14 therein. The lower end 44 of cylinder 42 is attached to the top of the base 16. An upper end of the cylinder 42, which is not shown in the drawing, is closed by a roof or the like, also not shown.

Unlike the cages of FIGS. 1-4, shown with vertical bars 28, the cages of FIGS. 5 and 6 include a frangible cylinder 42 having only a few small openings therein for a bird to spy bird treats 14 therein. This example of the combined bird device of the present invention 10 can be used for "the smarter-than-average bird" which can understand or sense or smell that there are bird treats 14 within the entire container. A small hole 46 through cylinder 42 of FIG. 5, how a bird has begun to seek a reward.

FIG. 6 illustrates still another embodiment of the present invention in which a portion of the frangible housing is shown as an angular container 48 having a lower end 50 attached to the base 16. An upper end of housing 48, which is not shown in the drawing, is closed by a roof or the like, also not shown. The housing 48 has a plurality of diagonal parallel openings 52 on one side of the housing 48 and a plurality of small circular holes 54 in an adjacent side of housing 48. FIG. 6 shows an internal divider system 32, similar to that of FIGS. 3 and 4, used to divide the interior of housing 48 into four sections 34, 36, 38, and 40 for bird treats 14.

The parallel openings 52 and circular holes 54 are an example of a number of differently shaped and spaced openings that may be incorporated into the side of the frangible container 18 so that the bird using the combined bird device of the present invention 10 can spy bird treats 14 inside the container 18. Also, the openings can be of different sizes, for small and large beaked birds.

It is thus seen that the present invention provides a system which can provide a bird a combined exerciser, educator, feeder and toy in a single, simple structure. It also provides a bird toy that will educate a bird to exercise its beak by encouraging the bird to engage in hard work and by then rewarding it with a treat. Additionally, it provides a device which not only causes a bird to engage in hard work in the form of exercise of its jaws and beak, but which stimulates the bird to learn how best it can obtain the reward of a bird treat when playing with and exercising on the device. It also provides enjoyment to the possessor of the combined bird exerciser, educator, feeder and toy when watching a bird use the device. Finally, it provides such a combined bird exerciser, educator, feeder and toy system, which is simple in construction and design, and which is inexpensive to make.

While the invention has been particularly shown, described and illustrated in detail with reference to preferred embodiments and modifications thereof, it should be understood by those skilled in the art that foregoing and other modifications are exemplary only, and that equivalent changes in form and detail may be made without departing from the true spirit and scope of the invention as claimed, except as precluded by the prior art.

The embodiments of the invention in which an exclusive property right or privilege is claimed are defined as follows:

1. A combined device for the exercise, education, feeding and entertainment of birds, comprising:

a container for storing bird treats therein, at least one portion of said container being constructed of frangible material which is of a nature such that a bird may peck, break, chew or tear through such material with its beak, and even swallow such material, without excessive danger of damaging its beak or digestive system, said container being comprised of a base, walls mounted on said base said walls defining an enclosure, and a top disposed on said walls in a manner such that any bird treats received within said container are inaccessible to such a bird until such a bird chews, pecks, tears or breaks through a portion of said frangible portion of said container;

a line, said line being attached to said base and extending through said container and said top; and at least one opening provided in said container, said opening being so sized and so located that a bird may see treats through any such opening, but not fully remove any treat which is stored within said container through any such opening until such a bird chews, pecks, tears or breaks through a portion of said frangible material of said container.

2. The combined bird device of the present invention as described in claim 1 wherein a plurality of openings are provided in said frangible material of said container, each said opening being so sized and so located that a bird may see said treats through substantially each such opening, but not fully remove all such treats which are stored within said container through any such opening until such a bird chews, pecks, tears or breaks through a portion of said frangible material of said container.

3. The combined bird device of the present invention as described in claim 1 wherein said container includes a plurality of spaced apart bars, the space between said bars being wide enough for a bird to spy any bird treats which are located within the container, but too narrow to allow such a bird to enjoy such bird treats prior to chewing, pecking, tearing or breaking through a portion of said frangible portion of the container.

4. The combined bird device of the present invention as described in claim 3 wherein said bars are composed of frangible material.

5. The combined bird device of the present invention as described in claim 3 wherein said bars are substantially vertical.

6. The combined bird device of the present invention as described in claim 3 wherein at least a portion of said base is composed of frangible material.

7. The combined bird device of the present invention as described in claim 1 wherein said walls include a plurality of spaced apart frangible substantially vertical bars, the space between said frangible bars being wide enough for a bird to spy any said bird treats which are located within said frangible container, but too small to allow such a bird to fully remove all said bird treats prior to chewing, pecking, tearing or breaking through a portion of said frangible bars, wherein further said base and said top are also composed of frangible material, and means for hanging said container from a support are provided.

8. The combined bird device of the present invention as described in claim 1 wherein a portion of said container is in the shape of a cylinder.

9. The combined bird device of the present invention as described in claim 8 wherein at least a portion of said portion of said container which is in the shape of a cylinder is composed of frangible material.

10. The combined bird device of the present invention as described in claim 1 wherein a portion of said container is in the shape of an angular housing.

11. The combined bird device of the present invention as described in claim 10 wherein at least a portion of said portion of said container which is in the shape of an angular housing is composed of frangible material.

12. The combined bird device of the present invention as described in claim 1 wherein a divider is disposed inside said container for defining, with said container, two or more isolated sections for bird treats within said container.

13. The combined bird device of the present invention as described in claim 12 wherein said divider is composed of frangible material.

14. The combined bird device of the present invention as described in claim 12 wherein a portion of said container which is external and adjacent to each of said two or more isolated sections for bird treats is composed of frangible material.

15. The combined bird device of the present invention as described in claim 12 wherein said divider defines four isolated sections for bird treats within said container.

16. The combined bird device of the present invention as described in claim 1 wherein said line is a chain.

17. A combined device for the exercise, feeding and entertainment of a large beaked bird, comprising, in combination:
 a base;
 a plurality of spaced apart frangible bars having a bottom and a top, said bottom of said bars mounted on and secured to said base to form an enclosure around said base, the space between said bars being wide enough for a large beaked bird to spy any bird treats which are located within said enclosure but too narrow to allow such a bird to fully remove all such bird treats prior to chewing, pecking, tearing or breaking through a portion of said frangible bars; and
 a divider disposed inside said container for defining, with said container, two or more isolated sections for bird treats within said container; and
 a top disposed on and secured to said top of said bars.

18. The combined bird device of the present invention as described in claim 17 wherein at least a portion of said base and at least a portion of said top are composed of frangible material.

19. The combined bird device of the present invention as described in claim 17 wherein a chain is attached to said base and extends through said enclosure defined by said bars and through said top.

* * * * *